INVENTOR
WALTER KLEIN

United States Patent Office 3,537,773
Patented Nov. 3, 1970

3,537,773
MICROSCOPE PLANO OBJECTIVE
Walter Klein, Auf der Hohl 36, Wissmar,
Kreis Wetzlar, Germany
Continuation-in-part of application Ser. No. 290,727,
June 26, 1963. This application Jan. 4, 1967, Ser.
No. 621,372
Int. Cl. G02b 9/34, 9/60, 21/02
U.S. Cl. 350—177                     7 Claims

ABSTRACT OF THE DISCLOSURE

A low-power tele-system type microscope objective is improved by correcting the curvature field by means of at least one converging lens member added to the tele-system to shorten the focal length thereof, the focal length being shorter than the adjustment length of said objective.

---

Figure 1:
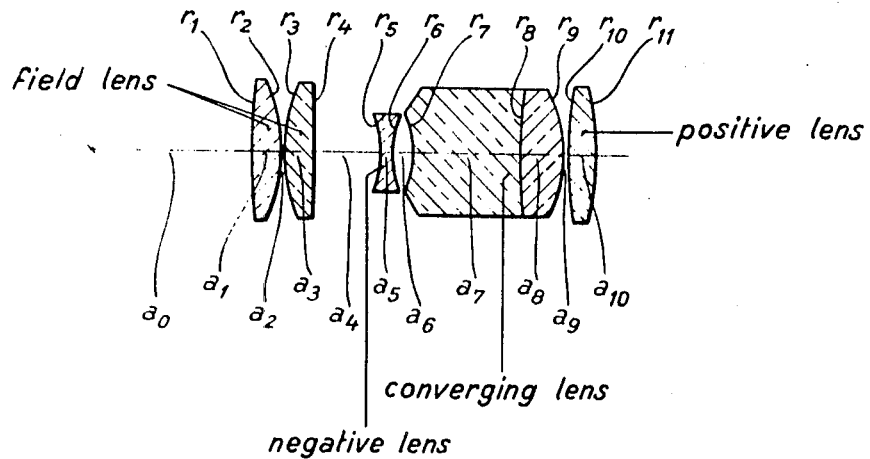

This is a continuation-in-part application of my copending application Ser. No. 290,727, filed June 26, 1963, now abandoned.

The invention described is a low-power tele-system type microscope objective, the curvature field of which is corrected by adding at least one converging lens member to the tele-system to shorten the focal length thereof, the focal length being shorter than the adjustment length, i.e. the distance from the nosepiece to the object plane.

Microscope scanning objectives, the focal lengths of which are longer than their adjustments have conventionally been built as tele-systems usually comprised of two cemented lens members. Difficulties arise with this type of objective, particularly when vertical illumination is used, and it has, therefore, been proposed to additionally use a field lens member with such objectives. Since tele-systems include positive and negative lens members, they are very advantageous in correcting the Petzval sum and, thus correcting the curvature of the field. It is accordingly an object of the present invention to make use of these advantageous tele-systems in microscope objectives wherein the adjustment length does not require a telescopic system and to obtain a good, zone-free correction of all image aberrations for a large field of view with a long object distance (working distance).

Usual tele-systems have a long focal length and the distance from the lens to the focal plane is shorter than the equivalent focal length. When the focal length of a microscope objective becomes shorter than the adjustment length, the telescopic effect of the power of refraction of its negative lens member is too small to have any useful effect on the correction of the Petzval sum. This, then, again causes difficulties in correcting the curvature of hte field. If the length of the objective is shortened, i.e. the distance between the objective and the vertex of the positive lens member of the tele-system facing the image is made shorter, to maintain the telescopic effect and thus to produce the desired correction of the Petzval sum, the correction of other lens aberrations becomes exceedingly difficult because of the larger aperture of such objectives.

U.S. Pat. 3,045,549 is concerned with a special telephoto lens for air photography having a negative meniscus component. French Pat. 1,221,108 also is of a construction different from that disclosed from the system described herein by virtue of an air space between its essential lenses.

In accordance with the present invention, these disadvantages are eliminated while the advantages of a tele-system in correcting the curvature of field is maintained by adding at least one converging lens member to the tele-system to shorten the focal length thereof.

According to a preferred embodiment, the converging lens member is a thick meniscus lens the thickness of which along the optical axis of the objective exceeds the dimension of the radius of the divergent lens surface between the negative and the positive lens member of the tele-system.

If desired and as has previously been proposed in tele-system, a field lens member may be added to the objective. The field lens member may consist of a single convergent lens or of two such lenses which may be cemented together.

It is preferred to provide a cementing face in at least one of the objective lens members at the image facing side, i.e. in the positive lens member and/or in the added converging lens. For purposes of correction, the negative lens member of the tele-system may also be cemented. In this case, the negative lens member preferably is a thick negative meniscus lens the thickness of which along the optical axis exceeds half the dimension of the radius of the divergent lens surface.

Figure 2:
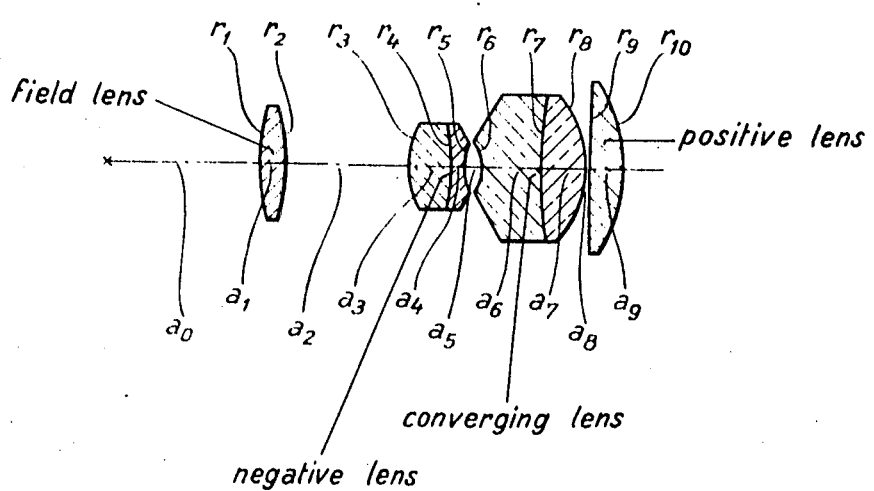

The above and other features of this invention will become more apparent in conjunction with the following two specific examples wherein reference is made to the cross-sectional side views of FIGS. 1 and 2 showing two microscopic objectives according to the invention.

In FIG. 1, 1 is a double convex lens, 2 is a convex-plano lens, 3 is a double concave or negative lens, 4 is a thick converging, meniscus lens, 5 is a double convex or positive lens which is cemented to lens 4, and 6 is a double lens.

In FIG. 2, 1 is a double convex lens, 2 is a thick double convex lens, 3 is a double convex or negative lens cemented to lens 2, 4 is a thick converging meniscus lens, 5 is a double convex lens cemented to lens 4, and 6 is a plano-convex lens.

In the examples, $n_e$ designates the refractive index of the glass of the lenses, based on the $e$ line, and $\nu_e$ is the glass dispersion value.

EXAMPLE 1

With reference to FIG. 1, this objective has a magnification of 4:1, a focal length $f=40.43$, $A=0.14$, $\Sigma P=-0.0263$, and $\Sigma \Gamma=+0.0270$, where:

$A$=aperture
$\Sigma P$=Petzval sum, and
$\Sigma \Gamma$=astigmatism.

| Radii | Lens thicknesses or separations | $n_e$ | $\nu_e$ |
|---|---|---|---|
| | $a_0=14.9117$ | | |
| $r_1=+37.794$ | | | |
| | $a_1=2.2$ | 1.57125 | 55.79 |
| $r_2=-21.06$ | | | |
| | $a_2=0.2$ | | |
| $r_3=+11.419$ | | | |
| | $a_3=3.8$ | 1.57240 | 49.18 |
| $r_4=\infty$ | | | |
| | $a_4=5.0$ | | |
| $r_5=-12.102$ | | | |
| | $a_5=1.2$ | 1.63003 | 35.41 |
| $r_6=+7.15$ | | | |
| | $a_6=1.6$ | | |
| $r_7=-7.7$ | | | |
| | $a_7=9.7$ | 1.63003 | 35.41 |
| $r_8=+52.0$ | | | |
| | $a_8=4.0$ | 1.48772 | 81.56 |
| $r_9=-11.49$ | | | |
| | $a_9=0.2$ | | |
| $r_{10}=+32.573$ | | | |
| | $a_{10}=2.5$ | 1.48772 | 81.56 |
| $r_{11}=-25.08$ | | | |

EXAMPLE 2

With reference to FIG. 2, this objective has a magnification of 8:1, a focal length $f=31.25$, $A=0.18$, $\Sigma P=-0.0317$, $\Sigma \Gamma=+0.341$.

| Radii | Lens thicknesses or separations | $n_e$ | $\nu_e$ |
|---|---|---|---|
| $r^1=+19.268$ | $a_0=13.3803$ | | |
| $r_2=-17.97$ | $a_1=2.2$ | 1.60994 | 56.42 |
| $r_3=+6.842$ | $a_2=11.0$ | | |
| $r_4=-14.0$ | $a_3=4.0$ | 1.48772 | 81.56 |
| $r_5=+5.5$ | $a_4=1.0$ | 1.60889 | 43.68 |
| $r_6=-3.489$ | $a_5=1.7$ | | |
| $r_7=+50.06$ | $a_6=4.98$ | 1.62690 | 46.71 |
| $r_8=-8.971$ | $a_7=4.0$ | 1.48772 | 81.56 |
| $r_9=+128.165$ | $a_8=0.2$ | | |
| $r_{10}=-13.46$ | $a_9=3.0$ | 1.48772 | 81.56 |

Computation and experiment have established that constructional data for the best forms of the tele-system type microscope objective of the embodiment of Example 1 and FIG. 1 preferably should lie within the ranges of values stated in the following statement of inequalities which relates (a) to all of the lens surfaces $r_1$ to $r_{11}$, naming said ardii in order from the front or object side of the objective along the optical axis from the object plane, (b) the lens thicknesses or separations $a_0$ to $a_9$, (c) refractive indices of the glasses of lenses 1 to 6 (based on the $e$ line), and (d) the glass dispersion values of the glasses of lenses 1 to 6.

(a) Ranges of radii:

$0.7f<r_1<1.3f$         $0.13f<-r_7<0.3f$
$0.4f<-r_2<0.7f$        $0.9f<-r_8<2f$
$0.2f<r_3<0.4f$         $0.2f<-r_9<0.4f$
$3f<r_4<-3f$            $0.6f<r_{10}<1.0f$
$0.2f<-r_5<0.4f$        $0.45f<-r_{11}<0.8f$
$0.12f<r_6<0.3f$ (b) Ranges of lens thicknesses or separations:

$0.25f<a_0<0.45f$       $0.02f<a_6<0.15f$
$0.03f<a_1<0.2f$        $0.1f<a_7<0.3f$
$0<a_2<0.2f$            $0.04f<a_8<0.25f$
$0.03f<a_3<0.3f$        $0<a_9<0.25f$
$0.05f<a_4<0.3f$        $0.02f<a_{10}<0.25f$
$0.01f<a_5<0.15f$ (c) Ranges of refractive indices of values $n_e$ for glasses of lenses:

$1.53<n_e1<1.62$        $1.58<n_e4<1.70$
$1.53<n_e2<1.62$        $1.46<n_e5<1.52$
$1.58<n_e3<1.70$        $1.46<n_e6<1.52$ (d) Ranges of glass dispersion values $\nu_e$ of lenses:

$45<\nu_e1<65$          $30<\nu_e4<45$
$40<\nu_e2<65$          $75<_e\nu5<87$
$30<_e\nu3<45$          $75<\nu_e6<87$

Computational and experimental data have established that constructional data for the best forms of the tele-system type microscope objective of the embodiment of Example 2 and FIG. 2 preferably should lie within the ranges of values stated in the following statement of inequalities relating to said embodiment.

(a) Ranges of radii:

$0.45f<r_1<0.85f$       $0.09f<-r_6<0.15f$
$0.4f<-r_2<0.8f$        $1.2<r_7<2.5f$
$0.18f<r_3<0.3f$        $0.2f<-r_8<0.4f$
$0.3f<-r_4<0.7f$        $3f<r_9<6f$
$0.13f<r_5<0.25f$       $0.3f<-r_{10}<0.6f$ (b) Ranges of lens thicknesses or separations:

$0.3f<a_0<0.6f$         $0.03f<a_5<0.15f$
$0.04f<a_1<0.2f$        $0.05f<a_6<0.25f$
$0.2f<a_2<0.5f$         $0.08f<a_7<0.25f$
$0.08f<a_3<0.25f$       $0<a_8<0.3f$
$0.02f<a_4<0.15f$       $0.03f<a_9<0.25f$ (c) Ranges of refractive indices values $n_e$ for glasses of lenses:

$1.35<n_e1<1.70$        $1.57<n_e4<1.68$
$1.46<n_e2<1.52$        $1.46<n_e5<1.52$
$1.55<n_e3<1.65$        $1.46<n_e6<1.52$ (d) Ranges of glass dispersion values $\nu_e$ of lenses:

$45<\nu_e1<65$          $35<\nu_e4<55$
$75<\nu_e2<87$          $75<\nu_e5<87$
$35<\nu_e3<55$          $75<\nu_e6<87$

It is readily seen from the above that there is provided within the limits of the parameters an improved low-power microscope objective having a corrected curvature of field and a focal length which is shorter than the adjustment length, and which is substantially free of image aberrations for a large field of view, all of which is in conformity with the stated objects of the invention. Microscope objectives which do not conform to one or more of the above stated specification are not satisfactory because they fail in possessing all of the stated advantages.

It will be appreciated that other forms than those illustrated in detail are possible and changes may be made in the precise constructional data recited herein without departing from the spirit of the invention as defined in the oppended claims.

The term "adjustment length," as used throughout the specification and the claims, designates the distance from the nosepiece, to the object plane.

The nosepiece is the revolving turret upon which the desired objectives are mounted by threading them into threads provided in the nosepiece. Various objectives of a same series are so manufactured to fit a particular adjustment length although the objectives themselves are each of different lengths. When such objectives are fitted onto the nosepiece and the object has been centered and focussed, the turret may be turned using the different objectives, only slight refocussing of the microscope being needed.

The term "adjustment length" defines the distance between the shoulder of the objective and the object. The distance between the lower end of the objective and the object is commonly called to free working distance. The adjustment length, thus, is the sum of the length of the objective, measured from its shoulder junction with the nosepiece, plus the free working distance, or air space, from the lower end of the objective to the object plane. For example, the adjustment length is 45 mm. for a plano objective of 44 mm. length and a free working distance of 1 mm. Correspondingly, the adjustment length also is 45 mm., with a plano objective of 30 mm. length and a free working distance of 15 mm. These two objectives thus have matched adjustment lengths and can be used on the same nosepiece. Thus, it is evident that for a particular series of objectives of different length, the working distance varies correspondingly. When an objective of a series of objectives which are manufactured to fit a different adjustment length is used, for instance one of 37 mm., with a microscope built for the 45 mm. adjustment length, an 8 mm. extention ring is threaded into the nosepiece and the objective is threaded with the extention ring. See, for example, The Microscope and Its Application, Ernst Leitz G.M.B.H. Wetzlar, Germany, XI/65/Fy/B, incorporated herein by reference, especially pages 6, 15, 18 and 19, and Plano Objectives for Microscopy in Transmitted Light, ibid., 1/65/CX/JD, also incorporated herein by reference.

I claim:

1. A telescopic microscope objective having a low

Petzval sum and providing a highly corrected curvature of field, said objective comprising in combination, in the direction from the object plane to the image plane along an optical axis, a biconvex field lens, a converging second lens which is convex facing the object and air-spaced from said field lens, a biconcave third lens whose surface facing the image side has a shorter radius of curvature than the surface facing the object side, a thick meniscus doublet lens concave toward the object side consisting of a thick biconcave lens element and a biconvex lens element, and a converging last lens convex on the image side and air-spaced from said meniscus lens, said meniscus lens having a strongly concave surface on the object side air-spaced from said third lens, a convex surface on the image side whose radius of curvature is greater than the radius of curvature of the concave surface, and a thickness exceeding the radius of curvature of the concave surface, and a thickness exceeding the radius of curvature of the concave surface and sufficient to give the mensicus overall positive power thereby shorting the focal length of the objective, said meniscus lens having a negative effect on the Petzval sum, this lens thereby correcting the increase in curvature of field, and the positive contribution made by the converging field lens to the Petzval sum, the respective contribution and compensation of the lenses to the focal length and to the Petzval sum being such as to give an objective with a short focal length and a low Petzval sum.

2. The telescopic microscope objective of claim 1 wherein the second lens in the direction from the object plane is a plono-convex field lens air-spaced from the biconvex field lens.

3. The telescopic microscope objective of claim 1 wherein the second lens and the third lens from the object side are cemented together, forming the respective elements of a doublet.

4. The telescopic microscope objective of claim 1 wherein the second lens and the third lens from the object side are cemented together forming the respective elements of a doublet and wherein said last lens is a plano-convex lens.

5. The telescopic microscope objective of claim 1 wherein said second lens is a plano-convex field lens disposed close to the biconvex field lens and said last lens is biconvex.

6. A tele-system type microscope objectve with a magnification of 4:1, a focal length $f=40.43$, an aperature $A=0.14$, a Petzval sum $\Sigma P=-0.0263$, and an astigmatism $\Sigma \Gamma=+0.0270$, and said objective having an optical axis along which there are arranged a first, a second, a third, and a fourth lens member, the first lens member consisting of a first and a second lens, each lens having two opposite surfaces, the surface of the first lens arranged to face an object having a radius of curvature $r_1$ and its distance from the object being $a_0$, the other surface of the first lens having a radius $r_2$, the surfaces of the first lens having a distance $a_1$ from each other, an adjacent one of the surfaces of the second lens having a distance $a_x$ from the other surface of the first lens and a radius $r_3$, the other surface of the second lens being plane, the surfaces of the second lens having a distance $a_3$, the second lens member being a lens having two opposite surfaces, one of the second lens surfaces having a distance $a_4$ from the other surface of the second lens of the first lens member and a radius $r_5$, the other one of the second lens surfaces having a radius $r_6$, the second lens surfaces having a distance $a_5$ from each other, the third lens member being a cemented meniscus lens consisting of two lens parts cemented together along a face, a first one of said lens parts having a surface with a distance $a_6$ from the other surface of the second lens and a radius $r_7$, the cemented face between the two lens parts having a distance $a_7$ from the surface of the first lens part and a radius $r_8$, the second lens part having a surface with a distance $a_8$ from the cemented face and a radius of $r_9$, and the fourth lens member being a lens having opposite surfaces, one of the fourth lens surfaces having a distance $a_9$ from the surface of the second lens part and a radius $r_{10}$, and the other fourth lens surface having a distance $a_{10}$ from the one fourth lens surface and a radius $r_{11}$, all distances measured along the optical axis, the successive radii $r$ of succeeding surfaces of curvature of the above named lenses and the successive axial distances $a$ between said surfaces of curvature being as follows:

| Radii | Lens thicknesses or separations | $n_e$ | $\nu_e$ |
|---|---|---|---|
| | $a_0=14.9117$ | | |
| $r_1=+37.794$ | $a_1=2.2$ | 1.57125 | 55.79 |
| $r_2=-21.06$ | $a_2=0.2$ | | |
| $r_3=+11.419$ | $a_3=3.8$ | 1.57240 | 49.18 |
| $r_4=\infty$ | $a_4=5.0$ | | |
| $r_5=-12.102$ | $a_5=1.2$ | 1.63003 | 35.41 |
| $r_6=+7.15$ | $a_6=1.6$ | | |
| $r_7=-7.7$ | $a_7=9.7$ | 1.63003 | 35.41 |
| $r_8=+52.0$ | $a_8=4.0$ | 1.48772 | 81.56 |
| $r_9=-11.49$ | $a_9=0.2$ | | |
| $r_{10}=+32.573$ | $a_{10}=2.5$ | 1.48772 | 81.56 |
| $r_{11}=-25.08$ | | | | wherein $n_e$ is the refractive index related to the $e$-line and $\nu_e$ is the Abbé number.

7. A tele-system type microscope objective with a magnification of 8:1, a focal length $f=31.25$, an aperture $A=0.18$, Petzval sum $\Sigma P=-0.0317$, and an astigmatism $\Sigma \Gamma=+0.0341$, and said objective having an optical axis along which there are arranged a first, a second, a third, and a fourth lens member, the first lens member being a lens having opposite surfaces, one of the lens surfaces arranged to face an object having a radius of curvature $r_1$ and its distance from the object being $a_0$, the other surface of the first lens having a radius $r_2$, the first lens surfaces having a distance $a_1$ from each other, the second lens member being a cemented meniscus lens consisting of two lens parts cemented together along a face, a first one of said lens parts having a surface with a distance $a_2$ from the other surface of the first lens and a radius $r_3$, the cemented face between the two lens parts having a distance $a_3$ from the surface of the first lens part and a radius $r_4$, the second lens part having a surface with a distance $a_4$ from the cemented face and a radius $r_5$, the third lens member consisting of another cemented meniscus lens consisting of two further lens parts cemented together along a face, a first one of the further lens parts having a surface with a distance $a_5$ from the surface of the second lens part of the first-named meniscus lens and a radius $r_6$, the cemented face between the two further lens parts having a distance $a_6$ from the surface of the first further lens part and a radius $r_7$, the second further lens part having a surface with a distance $a_7$ from the cemented face and a radius $r_8$, and the fourth lens member being a lens having opposite surfaces, one of the fourth lens surfaces having a distance $a_8$ from the surface of the second further lens part and a radius $r_9$, and the other fourth lens surface having a distance $a_9$ from the one fourth lens surface and a radius $r_{10}$, all distances measured along the optical axis, the successive radii $r$ of succeeding surfaces of curvature of the above named lenses and the successive axial distances $a$ between said surfaces of curvature being as follows:

| Radii | Lens thicknesses or separations | $n_e$ | $v_e$ |
|---|---|---|---|
| $r_1 = +19.268$ | $a_0 = 13.3803$ | | |
| $r_2 = -17.97$ | $a_1 = 2.2$ | 1.60994 | 56.42 |
| $r_3 = +6.842$ | $a_2 = 11.0$ | | |
| $r_4 = -14.0$ | $a_3 = 4.0$ | 1.48772 | 81.56 |
| $r_5 = +5.5$ | $a_4 = 1.0$ | 1.60889 | 43.68 |
| $r_6 = -3.489$ | $a_5 = 1.7$ | | |
| $r_7 = +50.06$ | $a_6 = 4.98$ | 1.62690 | 46.71 |
| $r_8 = -8.971$ | $a_7 = 4.0$ | 1.48772 | 81.56 |
| $r_9 = +128.165$ | $a_8 = 0.2$ | | |
| $r_{10} = -13.46$ | $a_9 = 3.0$ | 1.48772 | 81.56 |

References Cited

UNITED STATES PATENTS 2,587,347   2/1952   Lowenthal   350—220
3,045,549   7/1962   Baker   350—222

FOREIGN PATENTS 1,221,108   1/1960   France.

DAVID SCHONBERG, Primary Examiner

R. J. STERN, Assistant Examiner

U.S. Cl. X.R.

350—219, 220